(12) United States Patent
Bannister

(10) Patent No.: US 9,730,281 B2
(45) Date of Patent: Aug. 8, 2017

(54) LED DRIVER CIRCUIT USING FLYBACK CONVERTER TO REDUCE OBSERVABLE OPTICAL FLICKER BY REDUCING RECTIFIED AC MAINS RIPPLE

(71) Applicant: ACCURIC LTD, Crowle, Worcester, Worcestershire (GB)

(72) Inventor: Dave Bannister, Crowle (GB)

(73) Assignee: ACCURIC LTD, Worcester, Worcestershire (GB)

( * ) Notice: Subject to any disclaimer, the term of this patent is extended or adjusted under 35 U.S.C. 154(b) by 0 days.

(21) Appl. No.: 14/653,932

(22) PCT Filed: Nov. 27, 2013

(86) PCT No.: PCT/GB2013/053142
§ 371 (c)(1),
(2) Date: Jun. 19, 2015

(87) PCT Pub. No.: WO2014/096771
PCT Pub. Date: Jun. 26, 2014

(65) Prior Publication Data
US 2016/0198537 A1  Jul. 7, 2016

(30) Foreign Application Priority Data
Dec. 20, 2012 (GB) .................................. 1223042.1

(51) Int. Cl.
H05B 37/02 (2006.01)
H05B 33/08 (2006.01)

(52) U.S. Cl.
CPC ..... *H05B 33/0815* (2013.01); *H05B 33/0836* (2013.01); *H05B 33/0839* (2013.01); *H05B 33/0851* (2013.01); *H05B 37/02* (2013.01); *Y02B 20/347* (2013.01)

(58) Field of Classification Search
CPC .... H05B 33/08; H05B 37/02; H05B 33/0815; H05B 33/0836; H05B 33/0839; H05B 33/0851
USPC ......................................... 315/247, 294, 307
See application file for complete search history.

(56) References Cited

U.S. PATENT DOCUMENTS

| | | | |
|---|---|---|---|
| 6,737,846 B1 * | 5/2004 | Ben-Yaakov | G05F 1/70 323/222 |
| 2011/0025217 A1 * | 2/2011 | Zhan | H05B 33/0815 315/219 |
| 2012/0019714 A1 * | 1/2012 | Hiramatu | H05B 33/0815 348/370 |
| 2013/0128627 A1 * | 5/2013 | Moon | H02M 3/33507 363/21.17 |

* cited by examiner

*Primary Examiner* — Tung X Le
(74) *Attorney, Agent, or Firm* — Dennemeyer & Associates, LLC

(57) ABSTRACT

The present application describes a driver circuit for supplying a drive current to an LED lighting scheme. In particular, the present invention relates to an AC input driver circuit operable in conjunction with a current regulator device which utilizes a plurality of Zener diodes connected in parallel combinations. The driver circuit comprises a feedback mechanism that is operable to maintain a constant voltage across the current regulator. Embodiments of the present invention seek to address LED ripple and, thus, optical flicker arising from an LED driver, connected at its input, to an AC supply.

11 Claims, 3 Drawing Sheets

LED DRIVER CIRCUIT USING FLYBACK CONVERTER TO REDUCE OBSERVABLE OPTICAL FLICKER BY REDUCING RECTIFIED AC MAINS RIPPLE

The present invention relates to a driver circuit for supplying a drive current to an LED lighting scheme. In particular, the present invention relates to an AC input driver circuit operable in conjunction with a current regulator device as described in United Kingdom Patent Application No. 1210561.5.

Whilst continued improvements in the cost and reliability of Light Emitting Diodes (LEDs) have led to the wider adoption of LED technology in the areas of indoor and outdoor lighting, challenges exist in the provision of driver electronic circuitry suitable for supplying a regulated current to LED lighting systems. It is well known that variations in the drive current supplied to an LED load can adversely affect performance. In particular, LEDs which receive current from a power supply unit (PSU) which takes a single-phase Alternating Current (AC) input from a mains or similar supply, are sensitive to the presence of residual "voltage ripple" resulting from incomplete suppression of the AC component of the waveform emanating from a rectifier circuit that sits at or near the input of the PSU, and which AC component takes the form of a sinusoidal voltage at twice the frequency of the AC voltage from the said mains or similar supply.

LEDs, being diodes, exhibit in their operating region, low differential impedance—defined as the rate of change of voltage with current. This low differential impedance leads to the generation of significant levels of ripple current in the LEDs in the presence of voltage ripple. It can easily be shown that, for small amounts of voltage ripple, the corresponding LED current ripple can be expressed as:

$$\frac{\Delta Iled}{Iled} \approx \frac{\Delta Vdc}{Vdc} \times \frac{Vdc}{Red} \times \frac{1}{Zd} \qquad \text{equation (1)}$$

Wherein, $\Delta Vdc/Vdc$ is the peak-to-peak voltage ripple from the PSU, expressed as a fraction of the operating DC voltage provided by the PSU, $\Delta Iled/Iled$ is the peak-to-peak LED current ripple, expressed as a fraction of the operating LED current, and Zd is the differential impedance of the LED chain at the ripple frequency. The most important source of voltage ripple, in the context of an LED lighting application, is the full-wave rectification that occurs at the input to the PSU. This ripple occurs at twice the mains AC frequency—so, between 100 and 120 Hz. Within this frequency range, research has shown that a high proportion of healthy adults are sensitive to stroboscopic effects arising from the presence of LED light flicker. Such flicker is generated by the presence of current ripple within an LED lighting fixture.

The sensitivity of LED current ripple to PSU voltage ripple can easily be illustrated by reference to an example, relating to a typical requirement for an LED-based street-lighting assembly, in which an LED driver is used to provide a constant DC current to a string of 40 series-connected white LEDs. Each LED has, under normal operating temperatures, a voltage drop across it of around 3.5V, leading to a total voltage across the LED string (Vdc) of 140V. Furthermore, a typical white LED, operating at 3.5V, has a differential impedance of the order of 0.5 Ohm. Therefore, in this illustrative example, Zd is around 20 Ohms. Typical LED drive currents used in such an application are 350 mA or 700 mA.

If, in this illustrative example, the voltage ripple emanating from the LED driver is as low as 1% of Vdc—a very low value, typical of a very high quality LED driver—then, for 350 mA operation, the resulting LED current ripple would be around 20% of Iled, and for 700 mA operation, it would be around 10%, of Iled.

In view of the fact that in an LED, light output (luminous flux) is directly related to current, this current ripple can in turn lead to light flicker, which limits the acceptability of LED technology in applications such as office lighting, street lighting and industrial lighting. Indeed, recent research has shown sensitivity to stroboscopic effects arising from flicker amongst healthy adults, even at very low flicker levels. In fact, the research has indicated that at 10% flicker (resulting from approximately 20% current ripple at 100 Hz) around 75% of healthy adults can detect stroboscopic effects arising from the flicker. Such sensitivity to stroboscopic effects of flicker represents a challenge to the widespread adoption of LED lighting in applications where both comfort and accurate perception of movement are important—particularly where the scene being illuminated includes moving, oscillating, or rotating objects.

There is therefore a need to reduce the voltage ripple emanating from an AC input drive circuit used for supplying a drive current an LED lighting scheme, in order to alleviate current ripple and optical flicker.

This problem has been previously considered and attempts have been made to provide LED driver circuits which seek to address the problem of optical flicker arising as a consequence of the periodic variation of an AC power supply. Specifically, the provision of a capacitance at or near the output of the PSU serves to smooth the voltage ripple arising from the PSU, preferably down to levels of a few percent, as discussed above.

However, for various reasons relating to e.g. cost and reliability, it is often advantageous for LED lighting schemes, particularly those employed within street, office or industrial lighting fixtures, to be constructed from long strings of series connected LEDs, with each string being provided with a constant DC current by a single driver. Thus, in order to ensure that each driver produces sufficient light output from the string of LEDs it is driving, it is necessary to ensure that its DC output voltage is sufficiently high to drive a large number (typically, several tens) of LEDs. In view of this, it is necessary for the electrical capacitors used for smoothing voltage ripple emanating from the PSU to be capable of withstanding relatively high DC voltages e.g. in the region of up to 200V or more. This leads to the use of Electrolytic Capacitors, which in comparison with other types of capacitor, are capable of withstanding such voltages whilst providing high capacitance values, in the order of hundreds of micro Farads. Furthermore, the need to reduce voltage ripple to a minimum requires the use of high capacitance. This can be achieved by using either a small number of high value electrolytic capacitors, or a large number of lower value electrolytic capacitors. The number of such capacitors used to realize the required total capacitance is determined at least in part, by the maximum rated ripple current for each individual capacitor. However, the use of high value Electrolytic capacitors or several low value electrolytic capacitors increases the expected rate of capacitor failures which, in turn, increases the statistical failure rate of the PSU. The statistical failure rate of a PSU, or indeed any electrical assembly, is normally expressed by use of its reciprocal. This reciprocal (1/Statistical failure rate) is referred to as the Mean Time Between Failures, or MTBF, of the assembly.

It can therefore be appreciated that, in addition to minimizing LED current ripple and flicker, as previously discussed, it is also desirable to seek to reduce the number and capacitance of Electrolytic Capacitors required at the output of the PSU section of an LED driver with a view to improving the MTBF of the LED driver. Preferably, the high MTBF performance should be achieved without significantly compromising the current ripple generated within a string of LEDs driven by the LED driver. Indeed, it is desirable within the market, to ensure that the peak-to-peak value of the current ripple within the LED chain does not exceed around 1% of the DC current provided to the LED chain, thereby significantly reducing and possibly eliminating both directly and stroboscopically detectable flicker.

Thus, PSUs designed for use within LED drivers are often required—particularly when aimed at the street, office and industrial lighting markets—to address two opposing objectives. On the one hand, it is desirable for the PSU to give low voltage ripple—thereby minimising LED current ripple and optical flicker. On the other hand, it is desirable for the PSU to exhibit high reliability, corresponding to a low expected statistical failure rate. The first of these requirements often dictates the use of high capacitance at the output of the PSU, which in turn dictates the use of either several Electrolytic Capacitors, or high value Electrolytic Capacitors, or both. Using high value Electrolytic Capacitors, or several low value ones increases the expected rate of capacitor failures within a statistically meaningful sample of such PSUs, thereby increasing the statistical failure rate of the PSU.

In United Kingdom Patent Application No. 1210561.5, the entire disclosure of which is incorporated herein by way of reference thereto, there is described a current regulator for providing a regulated current from an input voltage. The current regulator described in United Kingdom Patent Application No. 1210561.5 comprises a voltage regulation means comprising a plurality of Zener diodes connected in parallel.

Application No. 1210561.5 describes a novel circuit topology whereby the current through the regulator is, to within voltage limits defined by the breakdown voltages of bipolar transistors, substantially constant with applied DC voltage, as well as being substantially constant with manufacturing variations in the properties of its component parts. It is recognised by the present inventor that this high differential impedance could be advantageously harnessed in order to mitigate the presence of voltage ripple arising from an AC input PSU. Such a PSU should advantageously be constructed in such a way that it can be integrated with the regulator, whilst preferably allowing the regulator to operate at or near its maximum efficiency.

According to a first aspect of the present invention there is provided a driver circuit for providing a regulated DC current to a load from an AC supply, which load comprises an LED lighting assembly, the driver circuit comprising: a rectifier and a flyback converter, wherein the rectifier is operable in use to convert an AC input voltage to a rectified voltage, which rectified voltage is supplied to the flyback converter, and wherein the flyback converter is operable in use to provide a variable DC voltage to the load; a current regulator which forms part of the load, the current regulator being series connected, in use, to an LED lighting assembly; and feedback means operable to maintain a constant DC voltage across the current regulator, wherein the current regulator comprises voltage regulation means comprising a plurality of Zener diodes connected in parallel.

Preferably the rectifier is a full-wave rectifier operable to convert an AC input voltage to a full-wave rectified voltage containing a DC voltage, which full-wave rectified voltage, including its DC voltage component, is supplied to the flyback converter.

Since embodiments of the present invention seek to minimise the value of the output capacitance of the PSU, it is advantageous to allow the PSU to produce an output voltage ripple, in the order of a few Volts, peak-to-peak and to rely on the high differential impedance of the regulator to provide the means by which the current ripple in the LED string, arising as a result of this PSU voltage ripple, is beneficially reduced. Thus, embodiments of the present invention are advantageous in that the PSU is preferably architected in such a way as to maintain a substantially constant voltage across the current regulator so that the high differential impedance of the current regulator serves to quench the LED current ripple that would otherwise arise from the voltage ripple.

A key feature of the current regulator described in United Kingdom Patent Application No. 1210561.5 is that the Zener diodes exhibit the same nominal Zener voltage. A current regulator constructed according to the teaching of United Kingdom Patent Application No. 1210561.5 takes advantage of the fact that, within a standard Zener diode fabrication process, the standard variation in Zener voltages around the nominal value is sufficiently small to allow current sharing between the Zener diodes within the parallel combination. It can be defined that a variation of between 0.1V and 0.3V may preferably exists between the Zener voltages of the Zener diodes comprised in the plurality of Zener diodes of the voltage regulation means.

According to a preferred embodiment of the present invention each Zener diode has the same nominal Zener voltage. Whilst having the same nominal Zener voltage, a variation of between 0.1V and 0.3V preferably exists between the Zener voltages of the Zener diodes comprised in the plurality of Zener diodes of the voltage regulation means.

A preferred embodiment of the current regulator taught in United Kingdom Patent Application No. 1210561.5 is shown in FIG. 1 and comprises a first current regulator circuit C1 cross-coupled to a second current regulator circuit C2. The first current regulator circuit C1 comprises a transistor circuit having a resistor R1 and a bipolar transistor T1. The first current regulator circuit also comprises a voltage regulator circuit VRC1 comprising a plurality of Zener diodes $Z1_1, Z1_2 \ldots Z1_n$ connected in parallel. The second current regulator circuit C2 comprises a driver circuit having a resistor R2 and a bipolar transistor T2. The second current regulator circuit also comprises a voltage regulator circuit VRC2 comprising a plurality of Zener diodes $Z2_1, Z2_2 \ldots Z2_n$ connected in parallel. The transistor comprises a silicon bipolar transistor of the NPN or PNP type. The transistors may form a complimentary pair—e.g. the transistor of the first or second current regulator circuit is of the PNP type whilst the transistor of other current regulator circuit is of the NPN type. The resistor of the first and/or second transistor circuit is typically operable to vary in order to serve as a current programming resistor.

The previously proposed current regulator operates from a DC voltage rail and provides a substantially constant current, suitable for driving an LED, or string of LEDs. Such a DC input current regulator can beneficially provide a constant current with a high setting accuracy and low thermal coefficient of current. Advantageously, such a current regulator can be programmed to provide a current over a range applicable to LED lighting drivers. It is also possible for two such regulators to be connected together in parallel, to provide higher currents, e.g. in the order of 350 mA to 700 mA, whilst also providing a low failure rate, of preferably less than 0.6 failures per million hours. This advantageously corresponds to an MTBF for the current regulator, in excess of 1.7 million hours.

According to a particularly preferred embodiment of the present invention, the current regulator comprises a first current regulator circuit and a second current regulator circuit, wherein the output of the first current regulator circuit is cross-coupled to said second current regulator circuit, each of the first and second current regulator circuits comprising: a transistor circuit comprising a resistor and a transistor; and a voltage regulator circuit, forming said voltage regulation means, the voltage regulator circuit operable to provide a regulated voltage to the respective driver circuit, wherein said voltage regulator circuit comprises a plurality of Zener diodes connected in parallel.

Preferably, the operating voltage across the regulator is given by:

$$V\text{reg} \geq Vk + V\text{rip}/2 \pm \qquad \text{equation (2)}$$

Wherein Vk is the knee voltage of the regulator and wherein Vrip is the peak-to-peak ripple voltage provided by the PSU.

Preferably, Vrip is no greater than Vk/2.

Preferably, therefore, the minimum DC voltage (Vreg (min)) provided in use to the current regulator is given by:

$$V\text{reg}(\text{Min}) = 5Vk/4$$

where Vk is the knee voltage of the current regulator.

Preferably, the current regulator comprises a two-terminal circuit. Preferably, the Zener diodes of the/each voltage regulator circuit comprise silicon Zener diodes. The Zener diodes of the/each voltage regulator circuit may exhibit a Zener voltage of less than 5.5V. Preferably the Zener diodes of the/each voltage regulator circuit exhibit a Zener voltage of between 2.0V and 3.0V.

Preferably, the Zener voltages of the Zener diodes comprised in the voltage regulator circuit of the/each current regulator circuit are selected such that:

$$Iz, opt = I_{spec}/2 \cdot N \qquad \text{equation (3)}$$

where Iz,opt is the current at which the rate of change of the Zener voltage with temperature substantially equals the rate of change of the base-emitter voltage vbe of the transistor of the current regulator circuit, N is an integer number of Zener diodes per voltage regulator circuit and $I_{spec}$ is a current regulator current at which the temperature coefficient is substantially zero.

It will be appreciated that embodiments of the present invention may be provided in conjunction with an LED lighting assembly, typically comprising a string of LEDs connected in series, or that the driver circuit may be provided separately for connection to or integration with an LED lighting assembly.

According to a second aspect of the present invention there is provided an illumination apparatus comprising an LED lighting assembly and a driver circuit according to the first aspect of the present invention, wherein the LED lighting assembly is connected in series with the current regulator to form part of the load.

For a better understanding of the present invention, and to show how the same may be carried into effect, reference will now be made, by way of example, to the accompanying drawings in which:

FIG. 2 shows a schematic an AC input LED driver according to an embodiment of the present invention incorporating the current regulator, connected to, or integrated with a PSU. The capacitance, $C_o$, placed at the output of the PSU provides a means for reducing the voltage ripple from the PSU.

Figure 2:
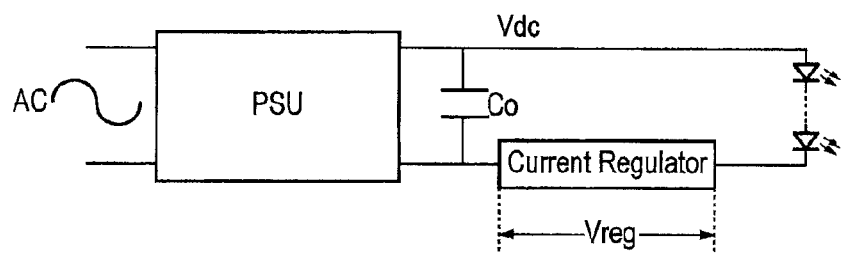
FIG. 2 shows a schematic an AC input LED driver according to an embodiment of the present invention.

As discussed previously, in order to minimise the statistical failure rate of the overall driver, this capacitance should be minimised, and should be provided by a minimum number of electrolytic capacitors. It is a primary requirement within the LED lighting and general illumination markets, that an AC input LED driver should operate at a high level of efficiency—defined as the ratio of output power, to input power, expressed as a percentage. A preferred minimum level of efficiency for a driver within these markets is around 85%, with a particularly preferred level of 90%. The overall efficiency of a driver according to the architecture shown in FIG. 2 is given by:

$$\mu(D) = \mu(\text{PSU}) \times \mu(\text{Reg}) \qquad \text{equation (4)}$$

Wherein, $\mu(\text{PSU})$ is the efficiency of the PSU and $\mu(\text{Reg})$ is the efficiency of the regulator. The efficiency of the regulator, when used in the manner shown in FIG. 2 is given by:

$$\mu(\text{Reg}) = (Vdc - V\text{reg})/Vdc \qquad \text{equation (5)}$$

Wherein, Vdc is the DC voltage provided by the PSU, and Vreg is the voltage drop across the regulator. Therefore, $\mu(\text{Reg})$ is maximised by minimising Vreg as a fraction of Vdc. This places two requirements on the PSU. Firstly, Vdc should preferably be as high as possible, and secondly Vreg should be as low as possible, whilst keeping the regulator operating in a manner necessitated by the properties of the PSU.

Figure 3:
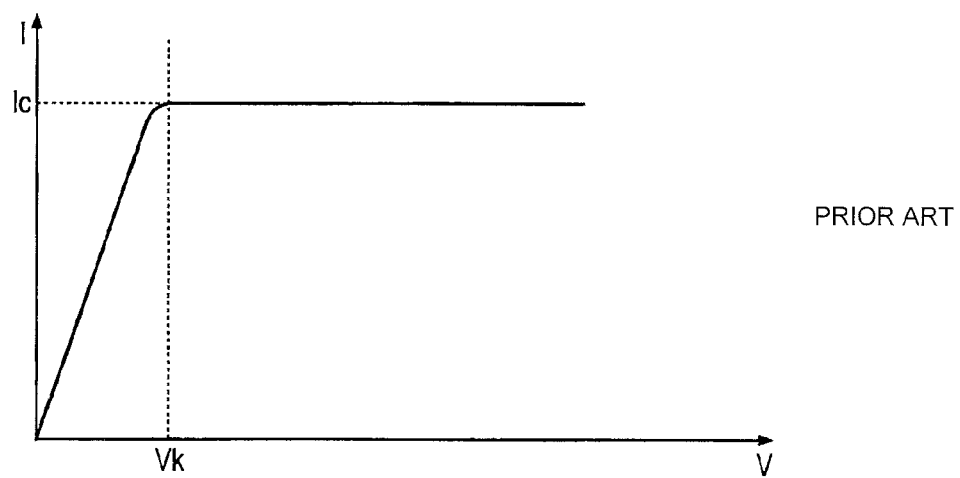
FIG. 3 shows the current versus voltage characteristics of the current regulator described in United Kingdom Patent Application No. 1210561.5.

FIG. 3 shows the current versus voltage characteristic of the current regulator disclosed in United Kingdom Patent Application No. 1210561.5. Above a certain value of Vreg, the current drawn by the regulator and, therefore, the current flowing through the LED string is constant and is set to a value, Ic, which is determined by the specific design of the regulator. This minimum operating value of Vreg is known as the knee voltage (Vk) of the regulator. Since preferred embodiments of the present invention seek to minimise the value of $C_o$, the PSU may be allowed to produce an appreciable voltage ripple, and to rely on the high differential impedance of the regulator to provide the means by which the current ripple in the LED string, arising as a result of this PSU voltage ripple, is reduced or minimised. For this to occur, the operating voltage across the regulator, Vreg, should preferably be:

$$V\text{reg} \geq Vk + V\text{rip}/2 \qquad \text{equation (6)}$$

Wherein, Vrip is the peak-to-peak ripple voltage provided by the PSU. It is therefore preferable for the PSU to be operable so as to maintain a substantially constant voltage across the regulator, so that the high differential impedance of the regulator is used to quench the LED current ripple that would otherwise arise from the voltage ripple. This said constant voltage should preferably be sufficiently higher than the regulator's knee voltage to ensure that the ripple voltage is subject to the said high differential impedance. At the same time, however, in order to minimise Vreg, thereby maximising the operating efficiency of the regulator, the value of Vrip should not be allowed to exceed an appreciable fraction of Vk.

As a guide, Vrip is preferably no greater than Vk/2. This ensures that the operating voltage of the regulator, Vreg, is close to Vk, whilst accommodating an appreciable voltage ripple. In this case, the minimum value of Vreg therefore becomes:

$$V\text{reg}(\text{Min}) = 5Vk/4 \qquad \text{equation (7)}$$

And the corresponding maximum value of overall efficiency of the LED driver becomes:

$$\mu(D, \text{Max}) = \mu(PSU) \times \left(1 - \frac{5Vk}{4Vdc}\right) \qquad \text{equation (8)}$$

The knee voltage, Vk, for a current regulator based on the architecture disclosed in reference 1 is around 6V.

The power delivered to the LED chain is given by:

$$P(LED) = I\text{led} \times \left(Vdc - \frac{5Vk}{4}\right) \qquad \text{equation (9)}$$

Therefore, by way of example, assuming an LED current of 700 mA (achievable using a regulator comprising two of the regulators disclosed in United Kingdom Patent Application No. 1210561.5reference 1, connected in parallel) achieving an output power, delivered to the LED chain, of 120 Watts requires a DC rail voltage from the PSU, of 179V. Furthermore, for this particular example, achieving an overall efficiency of 85% or greater, for the LED driver would require the PSU to have an efficiency of 89% or greater.

For the driver architecture shown in FIG. 2, the differential impedance, Zd, that impedes ripple current in the LED chain is that of the current regulator.

A 350 mA current regulator, employing the topology disclosed in United Kingdom Patent Application No. 1210561.5, is capable of delivering a differential impedance (dV/dI) greater than 2 KΩ at frequencies up to around 200 Hz. Therefore, such a current regulator, when integrated with an ac input dc output PSU that provides the ability to maintain a substantially constant DC voltage across the regulator, together with a maximum DC rail voltage of at least 179 V, with a peak-to-peak voltage ripple of 3V, would provide an LED driver capable of delivering a constant current of 350 mA, to an LED string, with a peak-to-peak LED current ripple as low as 0.4%. A 700 mA version of the same LED driver, realised by changing the current programming resistors in the current regulator, would deliver an LED drive current of 700 mA, with a peak-to-peak LED current ripple as low as 0.2%.

A further advantageous property of the DC current regulator disclosed in United Kingdom Patent Application No. 1210561.5 is its high MTBF, afforded by the absence of capacitors, the small number of transistors (4 for a 350 mA or 700 mA regulator, comprising two of the circuits disclosed in the reference) and the fact that these transistors are of a bipolar type. In order to take fullest advantage of this property when integrated into an LED driver, it is beneficial to combine a regulator according to this architecture, with a PSU that, as well as possessing the properties outlined above, also has a high MTBF. Achieving this is partly enabled by using only a small number of Electrolytic Capacitors at the output of the PSU, as facilitated by the high differential impedance of the regulator. It would be further enabled, for a generalised switch-mode power supply, by the use of a high maximum DC output voltage, which is known in the art to result in high efficiency operation for switch-mode circuitry. Such high efficiency leads to low power dissipation within the PSU, for a given output power, thereby contributing to a high MTBF for the same given output power.

A third contributing factor to achieving high PSU MTBF for a given power level and efficiency, is the minimisation of the component count within the PSU. It is known that for medium power levels (100 s of Watts) a generalised switch-mode PSU that achieves these power levels with a low component count is one based on a Flyback Converter.

Figure 4:
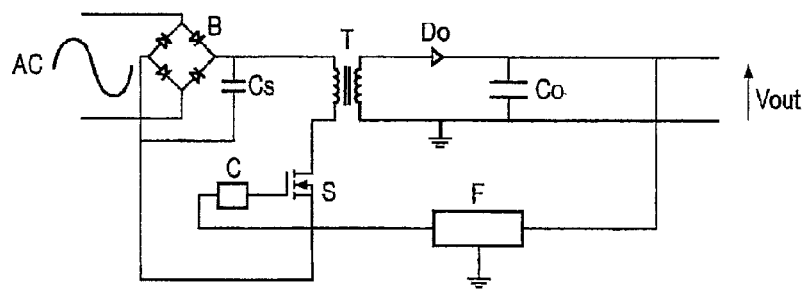
FIG. 4 shows a schematic of a previously considered flyback converter based power supply unit.

FIG. 4 shows the schematic of a previously considered Flyback Converter based PSU, configured to accommodate a range of load voltages. As will be appreciated by those skilled in the art the circuit operates by successively charging and discharging the primary inductive coil of a transformer, T, through the switching action of a Mosfet, S, which is controlled by a controller, C, through the application by C, of a rectangular voltage waveform, with a duty cycle, D, defined as the proportion of time that the said waveform spends in its ON-state, during which time the voltage provided by C is at a positive value, sufficient to turn the Mosfet on. The PSU provides a means of transferring electrical power from a time varying input voltage, Vin, provided by a bridge rectifier, B, connected to a smoothing capacitor, Cs, to a time varying output voltage, Vout. The voltage transfer ratio of the PSU (Vout/Vin) is determined mainly by the duty cycle, D, of the switching Mosfet and the turns-ratio, N, of the transformer, where N is here the ratio between the number of turns in the secondary coil of the transformer, to the number of turns in the primary coil of the transformer, according to the following relationship:

$$V\text{out} = V\text{in} \times N \times D/(1-D) \qquad \text{equation (10)}$$

It will be appreciated by a reader skilled in the art, that power supplies using a flyback converter topology are normally operated in such a manner that the duty cycle, D, of the switching Mosfet is varied, typically together with the frequency of switching, across the time period of each half cycle of the rectified output of the rectifier, in order to ensure that the current drawn from the rectifier is substantially in phase with the voltage supplied by the rectifier. The value of D in equation 10 varies, together with the frequency of the switching action of the Mosfet, S, as Vin varies, across each half cycle of its time domain waveform. In cases where the DC component of Vout is low (10 s of Volts) the voltage drop across the output diode shown as Do in FIG. 3, being around 1V during the period of the switching waveform during which it is conducting, becomes an appreciable fraction of the output voltage, thereby requiring this voltage drop to be taken into account. However, for a Flyback Converter with an output voltage of several 10 s of volts or more, the effect of this voltage drop is neglected.

It is clear from equation 9 that, in order to accommodate a varying output voltage arising as a result of a varying load, the duty cycle, D, for any instantaneous value of Vin, needs to change in response to variations in the load. Such variations would occur, in the case of a load comprising, at least in part, a series string of LEDs, due to either changes in temperature, or changes in the number of LEDs in the string, or both.

Altering the duty cycle of the switching Mosfet is actuated by feeding a voltage back to the Controller, via a feedback element, F, which normally takes the form of an Opto-isolator. The Controller is configured in such a way that, in response to the input from F, it alters the duty cycle, D, of a Pulse Width Modulated voltage applied to the gate of the Mosfet, thereby switching the Mosfet on and off with the same duty cycle as the Pulse Width Modulated voltage.

Figure 5:
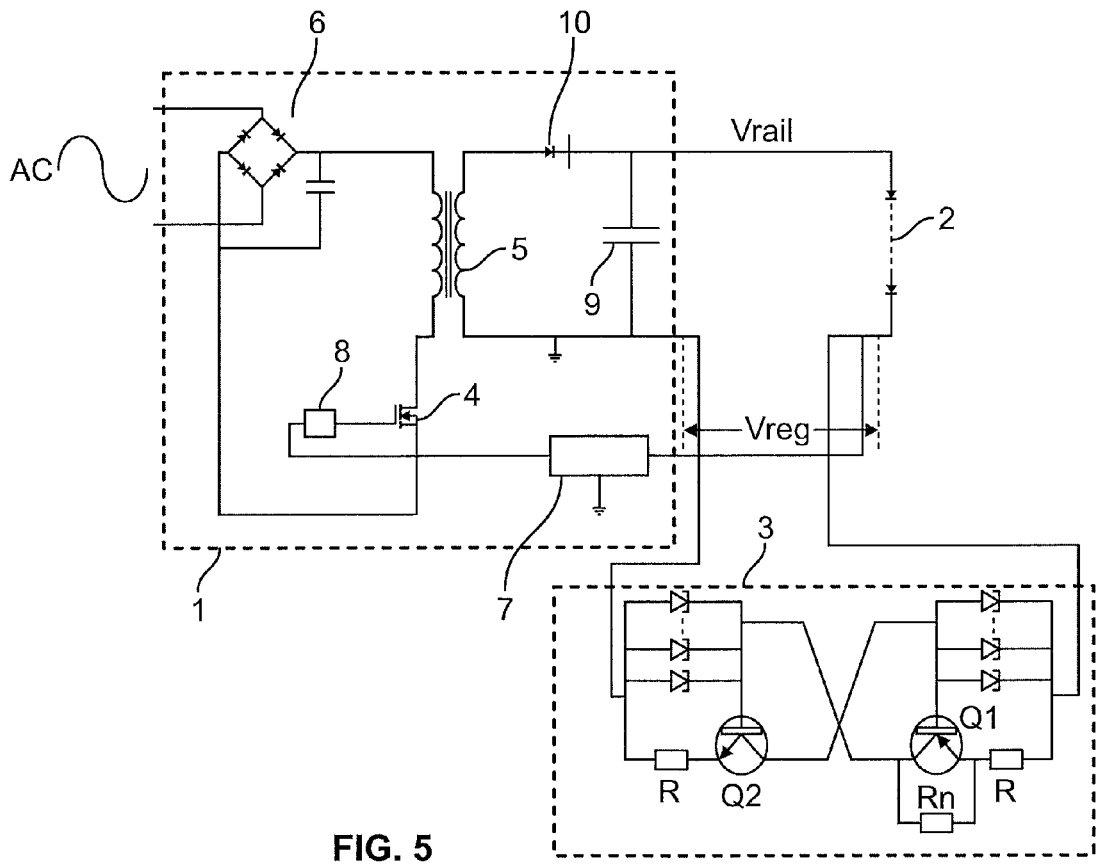
FIG. 5 shows a driver according to an embodiment of the present invention comprising a flyback converter based power supply unit.

FIG. 5 shows an LED driver comprising a an AC input, DC output power supply unit wherein the output DC voltage is controlled by a flyback converter and wherein the PSU is connected to, or integrated with a low-side constant current regulator, where the said regulator is based on a current regulator as disclosed in United Kingdom Patent Application No. 1210561.5.

When used in combination with the current regulator, 3, the PSU, 1, needs to provide a DC rail voltage (Vrail) at the top of the LED string, 2, which varies in response to the size of the load, as determined by the number of LEDs in the string, and temperature, whilst maintaining a constant voltage, Vreg, across the current regulator, 3. Due to the current regulating action of the regulator, 3, together with the fact that it is connected in series with the LED string, 2, by using the feedback control mechanism to control the voltage drop, Vreg, across the regulator, the rail voltage, Vrail takes a value given by the sum of the voltage drop across the LED string, 2, and Vreg. If the voltage drop across the LED string is denoted as Vled, then Vrail=Vled+Vreg. Furthermore, the value of Vrail is determined by the duty cycle of the switching Mosfet, 4, the turns ratio, N, of the transformer, 5, and the DC component of the rectified mains input voltage supplied to the Flyback Converter, by the input mains rectifier, 6, as discussed previously. Therefore:

$$Vrail = Vin \times N \times D/(1-D) \qquad \text{equation (11)}$$

And Vreg is given by:

$$Vreg = Vin \times N \times \frac{D}{1-D} - Vled \qquad \text{equation (12)}$$

Therefore, if, as in FIG. 5, the feedback mechanism provided by the Opto-isolator, 7, is used as shown, to adjust the duty cycle, D, of the output of the Controller, 8, to maintain a constant value of Vreg, then the feedback mechanism becomes a means for accommodating a varying value of Vled. The range of values of Vled that can be accommodated by a single LED driver according to the topology of FIG. 5 is determined, for a given value of turns ratio, N, by a number of factors, including the range of duty cycles that can be provided by the Controller, 9, the thermal handling properties of the switching Mosfet, 4, and the maximum withstand voltage of the output capacitor, 9, which is charged via diode 10, during each OFF portion of the switching waveform applied to the gate of the switching Mosfet, 4.

The value of the output capacitor, 9, which may be realised by either a single capacitor, or by a parallel combination of capacitors, is chosen by reference to the required output voltage ripple from the PSU. This voltage ripple can, in accordance with earlier argumentation, be as high as 3V, when running a regulator of the type disclosed in United Kingdom Patent Application No. 1210561.5, near its peak DC efficiency. The value of the output capacitor, 9, required to give a peak-to-peak output voltage ripple of Vrip, can be expressed, to a good approximation, as:

$$Co = \frac{Iled}{\omega \cdot \mu(PSU) \cdot Vrip}. \qquad \text{equation (13)}$$

Wherein, $\omega$ is the mains angular frequency, and is therefore equal to $2 \times \Pi \times f$, where f=50 Hz in the UK. Therefore, if the efficiency of the PSU is equal to the minimum acceptable value of 89% ($\mu(D)$=0.89) and Vrip is 3V, the minimum capacitance provided by the output capacitor, 11, is 835 µF for 700 mA operation. However this capacitance, or one slightly greater, is realised, each individual capacitor is required to have a rated voltage that is significantly greater than the maximum value of Vrail. Therefore, for operation at output voltages up to 179V, each capacitor should be rated to at least 300V.

The number of parallel capacitors used to realise Co is determined by ensuring that the ripple current in each capacitor does not exceed the maximum ripple current for an available, affordable, high quality Electrolytic Capacitor with a voltage rating of 300V or greater. A typical, affordable realisation of Co is a parallel connected pair of 440 µF, 300V Aluminium Electrolytic Capacitors, giving a total output capacitance of 880 µF.

The value of Vled is a function of the number of LEDs in the string, N, the current flowing in the LED string, Iled, and the LED junction temperature, Tj. In any particular embodiment of the circuit according to the topology shown in FIG. 5, the LED current, Iled, is determined by the current setting functionality of the regulator, 3, provided by the appropriate selection of current setting resistor values, as described in United Kingdom Patent Application No. 1210561.5. Therefore, in any particular embodiment of the circuit in FIG. 5, the value of Vled is a function of N and Tj. Consequently, embodiments of the present invention advantageously provide a means by which the current regulator disclosed in United Kingdom Patent Application No. 1210561.5 can be integrated into an AC input LED driver to accommodate a varying LED load, over a range defined by the voltage and thermal properties of the main electrical components. Thus, embodiments of the present invention advantageously provide for the realisation of LED drivers, leveraging the ripple current suppression, current setting accuracy and thermal tracking properties of the current regulator disclosed in United Kingdom Patent Application No. 1210561.5, whilst beneficially operating the said current regulator at or near its maximum efficiency.

ILLUSTRATIVE EXAMPLE

The following example of an embodiment of the invention is presented for purposes of illustration and it should be apparent to the reader that numerous other embodiments and illustrative examples, bounded by output voltage from the PSU section, the current drawn by the LED string and the mains voltage and frequency, are achievable.

This, or any other example of the present invention, is explained in terms of the relevant design parameters of the PSU section and current regulator section of the LED driver.

The peak output voltage of the PSU section of the driver is given by:

$$Vop = Vinp \times N \times Dp/(1-Dp) \qquad \text{equation (14)}$$

Wherein, Dp is the peak duty cycle of the switching action of the switching Mosfet, and Vinp is the peak value of a full-wave rectified single-phase mains voltage, which is given by:

$$Vinp = Vrms \times \sqrt{2} - 2 \times vd \quad \text{equation (15)}$$

Wherein, Vrms is the root-mean-square mains voltage and vd is the voltage drop across a single diode within the rectifier, during the half cycle of the mains input during which the said diode is conducting current. The typical value of vd for a Silicon rectifying diode is around 0.8V.

Vop in equation 14 is related to the DC component, Vo, of the output voltage, by the following equation:

$$Vop = Vo \times \pi/2 \quad \text{equation (16)}$$

Therefore, the values of Dp (peak Mosfet switching Duty Cycle) that corresponds to the maximum PSU output voltage, Vo,max given by:

$$Dp,\text{Max} = \pi \times Vo,\text{Max}/(2 \times N \times Vrms \times \sqrt{2} - 4Nvd + \pi \times Vo,\text{Max}) \quad \text{equation (17)}$$

An illustrative example of the PSU section of an LED driver, according to embodiments of the present invention can be defined, in terms of its range its maximum Mosfet duty cycle, when employing a transformer with a turns ratio of 2 and when operating from an RMS mains voltage of 230V, and being required to give a maximum output voltage of 180V.

$$Dp,\text{Max} = 0.304 = 30.4\% \quad \text{equation (18)}$$

The corresponding maximum peak-to-peak ripple current in the output capacitor is given, by standard flyback converter design equations, as:

$$ic,pp = Vrms \times Dp,\text{Max} \times \sqrt{2}/(Lp \times N \times fsw) \quad \text{equation (19)}$$

Wherein, Lp is the inductance of the primary of the transformer and fsw is the nominal frequency of the switching waveform applied to the Mosfet, by the controller. Using typical values of 0.75 mH and 200 KHz, for this example, the peak-to-peak capacitor ripple current is equal to 326 mA.

As previously discussed, in order to produce a peak-to-peak output voltage ripple of 3V at maximum output voltage, when connected to a 700 mA current regulator the output capacitance needs to be at least 835 µF. Given the need to minimise the current ripple through any single capacitor, whilst keeping the number of capacitors to a minimum, as well as operating well below the rated voltage of the capacitors used, an output capacitance around 5 percent greater than this minimum is best realised by two 440 µF, 300V electrolytic capacitors, connected in parallel.

The current regulator, connected to the PSU, as shown in FIG. 5, may be configured to provide a constant current of 700 mA for the purposes of the present example. Using the disclosure of United Kingdom Patent Application No. 1210561.5, this particular regulator would be realised by using two regulator circuits, connected in parallel, where each such regulator circuit takes the form shown in FIG. 1 and where, by reference to the said FIG. 6, for the single regulator:

$$IT = 350 \text{ mA} \quad \text{equation (20)}$$

By using the relevant design equation given in United Kingdom Patent Application No. 1210561.5, and putting R1=R2=R:

$$R = 2 \times \frac{Vz - vbe}{IT} \quad \text{equation (21)}$$

Yielding, in accordance with the values given in United Kingdom Patent Application No. 1210561.5 (vbe≈0.7V and Vz=3 V) R=13Ω.

The other design variable for a regulator of the type disclosed in United Kingdom Patent Application No. 1210561.5 is the number of Zener diodes, each with a Zener voltage of 2.4 V at a reference current of 5 mA, used in each of the regulators. In United Kingdom Patent Application No. 1210561.5, this is determined, for a given value of regulator current, by assuming that the thermal coefficient of regulated current needs to be substantially zero. Following the procedure outlined in United Kingdom Patent Application No. 1210561.5, wherein the current through each diode is preferable required to be around 14.5 mA, realising a single current regulator with a regulated current of 350 mA and with a thermal coefficient of current that is substantially zero, would require 12 Zener diodes in each 'Zener stack' as defined in United Kingdom Patent Application No. 1210561.5. However, for the general case of a current regulator according to the invention of United Kingdom Patent Application No. 1210561.5, the thermal coefficient of the regulated current is given by equation 18 of United Kingdom Patent Application No. 1210561.5, as:

$$TC = \frac{\frac{\delta Vz}{\delta T} - \frac{\delta vbe}{\delta T}}{Vz - vbe} \quad \text{equation (22)}$$

Where the thermal coefficient of the base-emitter voltage of a Silicon bipolar transistor, δvbe/δT is, to a good approximation, −2.0 mV/K. From inspection of the thermal characteristic of a typical 2.4V Silicon Zener diode (where 2.4V is the value of Vz at a reference current of 5 mA) the value of δVz/δT at twice the optimal Zener current (2×14.5 mA=29 mA) is around −2.2 mV/K. The value of Vz at this current, for the same typical Silicon diode is 3V. Therefore, the temperature coefficient of current for the 350 mA current regulator, used in this illustrative example is −87 ppm/K. This shows that the number of Zener diodes per 'Zener stack' in each of the two 350 mA current regulators used within this illustrative example can be reduced from 12 to 6, whilst maintaining a low temperature coefficient of current.

Thus, the illustrative example, defined above, is achievable, using a PSU according to the modified flyback converter topology shown in FIG. 5, in which the current regulator (3) takes the form of two parallel connected current regulator circuits, as disclosed in United Kingdom Patent Application No. 1210561.5, and wherein: For the PSU, driven from a 230V, 50 Hz mains supply: Vout=60 to 180V, D,Max=30%, N=2, Co takes the form of two 440 µF, 300V rated electrolytic capacitors, fsw=200 KHz, and the primary inductance of the transformer is 0.75 mH.

Figure 1:
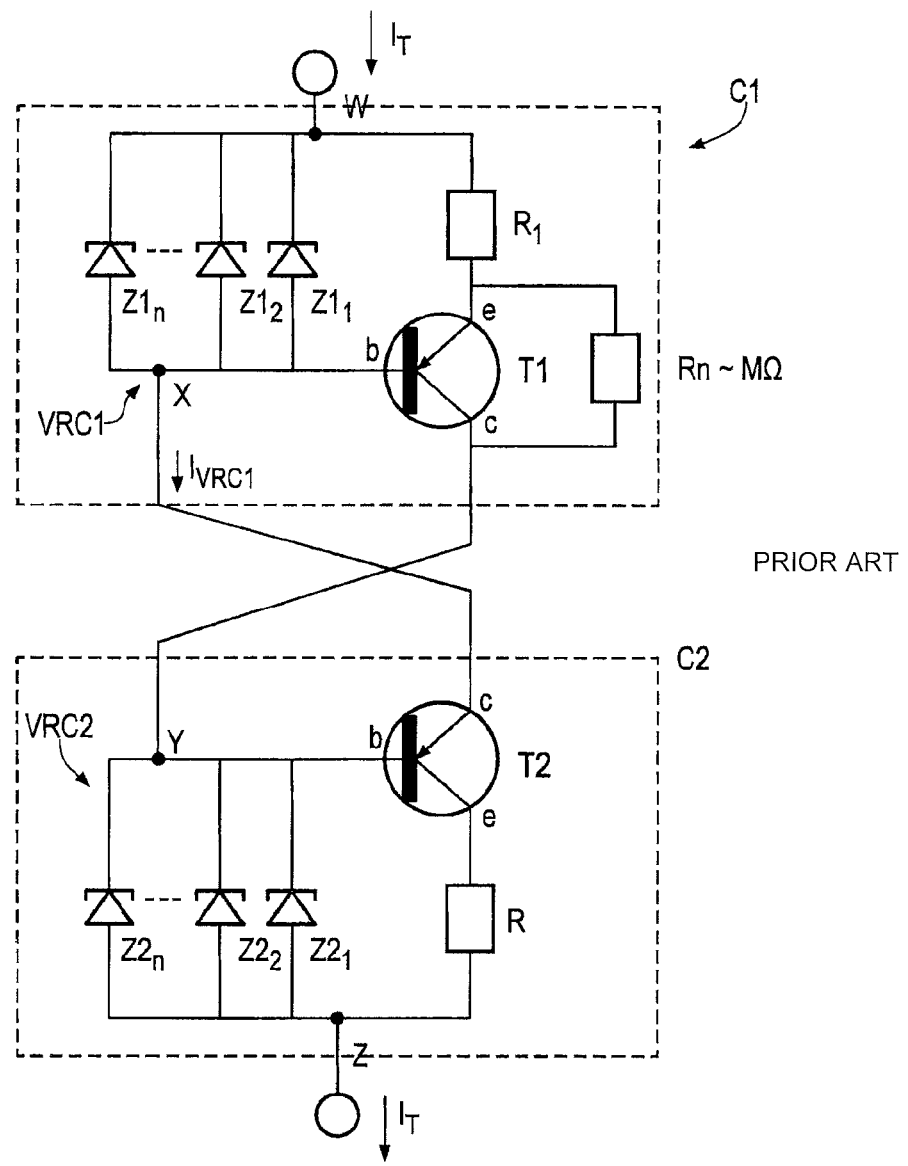
FIG. 1 shows a preferred embodiment of the current regulator described in United Kingdom Patent Application No. 1210561.5.

For each of the two current regulator circuits contained within the current regulator (3): Each Zener stack, as shown in FIG. 1 comprises 6 Silicon Zener diodes, each with a Zener voltage of 2.4 V at a reference current of 5 mA, and each resistor, shown as R1 and R2 in FIG. 1 takes the value 13Ω.

The invention claimed is:

1. A driver circuit for providing a regulated DC current, to a load from an AC supply, which load comprises an LED lighting assembly, the driver circuit comprising:
a rectifier and a flyback converter, wherein the rectifier is operable in use to convert an AC input voltage to a rectified voltage, which rectified voltage is supplied to the flyback converter, and wherein the flyback converter is operable in use to provide a variable DC voltage to the load;

a current regulator which forms part of the load, the current regulator being series connected, in use, to the LED lighting assembly; and feedback means operable to maintain a constant DC voltage across the current regulator;

wherein the current regulator comprises voltage regulation means comprising a plurality of Zener diodes connected in parallel.

2. A driver circuit as claimed in claim 1, wherein the current regulator comprises a first current regulator circuit and a second current regulator circuit, wherein the output of the first current regulator circuit is cross-coupled to said second current regulator circuit, each of the first and second current regulator circuits comprising:

a transistor circuit comprising a resistor and a transistor; and a voltage regulator circuit, forming said voltage regulation means, the voltage regulator circuit operable to provide a regulated voltage to the respective driver circuit, wherein said voltage regulator circuit comprises a plurality of Zener diodes connected in parallel.

3. A driver circuit as claimed in claim 1, wherein each Zener diode has the same nominal Zener voltage.

4. A driver circuit as claimed in claim 1, wherein a variation of between 0.1V and 0.3V exists between the Zener voltages of the Zener diodes comprised in the voltage regulation means.

5. A driver circuit as claimed in claim 1, wherein the feedback means is connected, in use, from a feedback point located between the current regulator and the LED lighting assembly to a controller of the flyback converter.

6. A driver circuit as claimed in claim 1, wherein the power supply unit is operable such that the operating voltage across the regulator is given by:

$$Vreg \geq Vk + Vrip/2$$

wherein Vk is the knee voltage of the regulator and wherein Vrip is the peak-to-peak ripple voltage provided by the power supply unit.

7. A driver circuit as claimed in claim 1, wherein the power supply unit is operable such that Vrip is no greater than Vk/2.

8. A driver circuit as claimed in claim 1, wherein the minimum DC voltage (Vreg (min)) provided in use to the current regulator is given by:

$$Vreg(Min) = 5Vk/4$$

where Vk is the knee voltage of the current regulator.

9. A driver circuit as claimed in claim 1, wherein two current regulators are provided in parallel, and wherein each current regulator comprises:

a first current regulator circuit and a second current regulator circuit, wherein the output of the first current regulator circuit is cross-coupled to said second current regulator circuit, each of the first and second current regulator circuits comprising:

a transistor circuit comprising a resistor and a transistor; and a voltage regulator circuit, forming the voltage regulation means and operable to provide a regulated voltage to the respective driver circuit, wherein said voltage regulator circuit comprises a plurality of Zener diodes connected in parallel.

10. A driver circuit as claimed in claim 9, wherein each current regulator is resistively set to provide, in use, a constant current in the range of 350 mA to 700 mA.

11. An illumination apparatus comprising an LED lighting assembly and the driver circuit as claimed in claim 1, wherein the LED lighting assembly is connected in series with the current regulator to form part of the load.

* * * * *